United States Patent Office 3,796,752
Patented Mar. 12, 1974

3,796,752
PROCESS FOR MANUFACTURING THIOPHOSPHONYL HALIDES
Harold Mahonrai Pitt, Lafayette, Calif., assignor to Stauffer Chemical Company, New York, N.Y.
No Drawing. Filed Aug. 13, 1971, Ser. No. 171,742
Int. Cl. C07f 9/40, 9/42
U.S. Cl. 260—543 P                                2 Claims

ABSTRACT OF THE DISCLOSURE

This invention relates to the process of manufacturing ester derivatives of phosphonic acid that have insecticidal properties. More particularly, this invention relates to the manufacture of intermediate compounds having the following formula:

wherein R is selected from a group consisting of methyl and ethyl and X is chlorine or bromine. This reactive intermediate is formed by reacting alkyl aluminum sesquihalide with an excess of phosphorus trihalide. The reaction product is then treated with sulfur to form the end product. This product is then treated with an alkylate and reacted with thiophenol or an alkyl or halo-substituted thiophenol to produce the insecticidal ester derivatives of phosphonic acid.

DESCRIPTION OF THE INVENTION

Among the several insecticidal active compounds available, the ester derivatives of phosphonic acid are notably successful because this type of insecticide controls a wide variety of insect pests. Representative ester derivatives of phosphonic acid are described and claimed in U.S. Pat. Nos. 2,988,474 and 3,361,855 and are represented by the following generic formula:

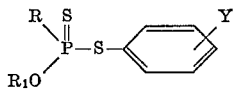

wherein R and $R_1$ are selected from the group consisting of methyl and ethyl and Y is selected from the group consisting of hydrogen, halogen and alkyl groups having up to four carbon atoms. As is pointed out, these insecticidal active compounds are made by reacting a compound having the formula

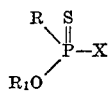

wherein X is chlorine or bromine, with thiophenol or an alkyl substituted thiophenol, preferably in the presence of an alkali in an organic solvent.

It has been discovered that a reactive intermediate can be manufactured by reacting alkyl aluminum sesquihalide with an excess of phosphorus trihalide to form an alkyl phosponodihalide aluminum trihalide complex. This reaction is carried out at a temperature of between about 10° C. and 65° C. The excess phosphorus trihalide can serve as the solvent or an alphatic or alicyclic hydrocarbon can be used as the solvent. The alkyl phosphonodihalide aluminum trihalide complex is then treated with sulfur in the form of flakes to form an alkyl phosphonothiodihalide aluminum trihalide complex. This complex is then cleaned by any known method such as by hydrolyzing with hydrochloric acid at a temperature of between −10° C. and to about 15° C.

Thereafter, the solvent excess phosphorus trihalide and other low boiling impurities along with the aluminum trihalide are distilled from the reaction mixture to produce essentially quantitative yields of a compound having the formula

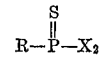

wherein R is methyl or ethyl and X is chlorine or bromine.

The alkyl phosphonothiodihalide end product can then be reacted with an alkylate of the formula $NaOR_1$, where $R_1$ is methyl or ethyl to form the product having the formula

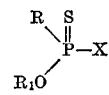

This product is then reacted with thiophenol or substituted thiophenol to form the insecticidal end product of the formula

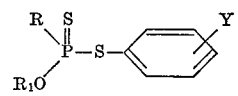

wherein R and $R_1$ is methyl or methyl and Y is hydrogen, halogen or lower alkyl having from 1 to 4 carbon atoms.

In order to illustrate the merits of the present invention, the following examples are provided:

EXAMPLE 1

Ethylphosphonothiodichloride (EPTD) was prepared as follows:

A 500 gallon glass-lined Pfaudler was charged with 3,372 pounds of phosphorous trichloride ($PCl_3$) (65% excess) and heated to 18° C. Fifty pounds of ethylaluminum sesquichloride were charged in a slug to the $PCl_3$ through a one-half inch diameter stainless steel dip pipe. In approximately one-half minute the reactor temperature rose to 35° C. The adiabatic temperature rise is approximately 4.2° C. per 1% of sesquichloride addition for the initial $PCl_3$ charge.

During a period of 10 hours, a total of 1,228 pounds of sesquichloride were charged in 50 pound slugs. The temperature rise after each slug indicated that the reaction occurred and was not inhibited.

With full cooling water on the jacket (10° C. water at 20 g.p.m.) the temperature rise averaged 13° C. for each 50 pounds of sesqui addition. The reactor was cooled to 25° C. prior to each sesqui slug, and the maximum reactor temperature was 39° C.

Flowers of sulfur were screw fed through a pressurized hopper into a vertical 3 inch diameter by 5 ft. long pipe which was connected to a 3 inch ball valve. The sulfur was dropped on the surface of the reaction mixture, and was fed in 50 lb. batches to the reactor which was at 40–45° C. The temperature rose to about 55° C. per charge. A total of 475 lbs. (stoichiometric charge) of sulfur was added over a period of 5 hours while maintaining a maximum temperature of 60° C. The reaction mixture was maintained at 55° C. for an additional period of 1 hour to ensure complete reaction of the sulfur with the $EtPCl_2$.

Excess $PCl_3$ and the $PSCl_3$ formed from the reaction of $PCl_3$ with sulfur were removed by vacuum distillation. Initially 77% of the excess $PCl_3$ charged was removed under a pressure of 110 mm. Hg and at a still pot temperature ranging from 35 to 91° C. The remaining $PCl_3$ and $PSCl_3$ was removed at 47.5 mm. Hg pressure and a temperature ranging from 60 to 100° C. Approximately 1,000 lbs. of $PCl_3$ was recovered at the reduced pressure of 110 mm. Hg. Analysis of this material was 99+% $PCl_3$ with a trace of $PSCl_3$.

For the quench reaction, 5,000 pounds of crushed ice and 100 gallons of 33% HCl were charged to a 1,000 gallon glass-lined Pfaudler. The EPTD—AlCl₃ mixture was added until the temperature rose above 0° C. This indicated that all of the ice had melted. Quench time was 35 minutes. Two separate quenches were required to process the entire EPTD—AlCl₃ charge. Approximately 5 pounds of ice were required for each pound of EPTD.

The lower organic phase was dried by contact with CaCl₂ in a 6 inch diameter by 12 foot long column. The feed rate was 375 lbs. EtPSCl₂/hour, and the final moisture content was 0.04%. The upper aqueous phase was then drummed for disposal.

A total of 1,930 pounds of EPTD were produced. The gas chromatography area percent analysis was: 0.1% PCl₃, 0.2% PSCl₃, 1.0% Et₂PSCl, and 98.3% EPTD. The sesqui to EPTD yield was 81%.

EXAMPLE 2

An earlier batch of EPTD was also produced. However, in this run the sesquichloride was added to the PCl₃ at 70 to 78° C. This resulted in the production of large amounts of Et₂PSCl (10–20%), and vacuum distillation of the product was necessary. The sesquichloride to EPTD yield was only 48%.

EXAMPLE 3

Several runs were made using the procedure as outlined in Example 1. The results of these runs are tabulated in Table I.

EXAMPLE 4

Preparation of O-ethyl-S-phenyl-ethylphosphonodithioate from EPTD

In a two-liter flask was placed one liter of toluene which was dried azeotropically. Sixty-six grams of metallic sodium were added and the mixture heated to 100–105° C. The mixture was well agitated and a slow addition of 186 ml. ethanol (absolute) was begun. The produced hydrogen was passed through a cooler and the condensed liquids returned to the reactor. When all the ethanol had been added, no metallic Na remained and a thick slurry of sodium ethylate in toluene had been produced.

Then, 30.5 ml. of EPTD were placed in a 500 ml. Morton flask. With agitation, this was cooled to —5° C. and slug addition of the sodium ethylate was begun (approximately 120 mls. were used). The temperature was held between —5 and +24° C. Reaction was considered complete when the EPTD content was about 0.1%. To this was then added a solution of 26 mls. thiophenol in 20 ml. of H₂O and 15 ml. 50% NaOH. This mixture was agitated thoroughly at 75–85° C. The phases were separated, the upper toluene phase washed with 100 mls. fresh water and then vacuum stripped of solvent. The product was equal to 50.5 grams (82% yield) and was O-ethyl-S-phenyl-ethylphosphonodithioate at about 99% pure by GC.

TABLE I

| Number | Alkyl | Conc. in solvent, vol. percent | Gram moles of PCl₃ | Excess PCl₃, percent | Reaction temp., °C. | Sulfur reaction temp., °C. | Alkyl to EPTD yield, percent |
|---|---|---|---|---|---|---|---|
| 1 | 0.17 | 50% hexane | 0.78 | 50 | 50–55 | | 90 |
| 2 | 0.212 | do | 0.975 | 53 | 50–55 | | 72 |
| 3 | 0.234 | do | 0.975 | 39 | 50–55 | | 96 |
| 4 | 0.127 | 37.5% cyclohexane | 0.585 | 53 | 50–55 | | 90 |
| 5 | 0.212 | 50% cyclohexane | 0.975 | 53 | 50–55 | | 93 |
| 6 | 0.170 | 45% hexane | 0.778 | 53 | 50–55 | 65 | 99 |
| 7 | 0.425 | 50% hexane | 1.95 | 53 | 50–55 | | 99 |
| 8 | 0.85 | 50% cyclohexane | 3.9(4) | 53 | 55–60 | 35–45 | |
| 9 | 0.212 | No solvent | 0.975 | 53 | 55–60 | | 93 |
| 10 | 0.212 | do | 0.975 | 53 | 50–60 | | |
| 11 | 0.212 | do | 1.09 | 72 | 50–55 | | 94 |
| 12 | 0.212 | do | 1.09 | 72 | 27–34 | 60 | 89 |

What is claimed is:
1. A process comprising the steps of:
   (a) reacting alkyl aluminum sesquihalide with an excess of phosphorous trihalide at a temperature of between about 10 and 65° C. to form an alkyl phosphonodihalide aluminum trihalide complex;
   (b) treating the complex formed in step (a) with sulfur;
   (c) hydrolyzing the product of step (b) at a temperature of between —10° C. and 15° C. to a compound of the formula

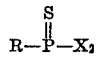

wherein R is methyl or ethyl and X is Cl or Br.

2. The process as set forth in claim 1 wherein step (a) is carried out in the presence of an aliphatic or alicyclic hydrocarbon solvent.

References Cited

UNITED STATES PATENTS 2,744,132  5/1956  Clay _____ 260—543 P

FOREIGN PATENTS 532,078  10/1956  Canada _____ 260—543 P

JAMES A. PATTEN, Primary Examiner

R. D. KELLY, Assistant Examiner

U.S. Cl. X.R.

260—973